United States Patent

[11] 3,572,502

| [72] | Inventors | Richard M. Quinn<br>Muncie, Ind.;<br>Donny W. Candioto, Broken Arrow, Okla. |
|---|---|---|
| [21] | Appl. No. | 786,001 |
| [22] | Filed | Dec. 23, 1968 |
| [45] | Patented | Mar. 30, 1971 |
| [73] | Assignee | Ball Corporation |

[54] ELECTRONIC CLOSURE DETECTION SYSTEM
15 Claims, 4 Drawing Figs.

[52] U.S. Cl. .................................................. 209/73,
324/34, 209/80, 209/111.8
[51] Int. Cl. .................................................. B07c 5/344
[50] Field of Search .................................................. 209/73, 74,
75, 111.8, 80; 324/34 (Disp, Posit, Osc.)

[56] References Cited
UNITED STATES PATENTS

| 2,998,117 | 8/1961 | Newburn.................... | 198/188X |
| 3,137,160 | 6/1964 | Mathias...................... | 209/80(UX) |
| 3,206,027 | 9/1965 | Bailey.......................... | 209/80(UX) |
| 3,392,829 | 7/1968 | Keinanen ................... | 209/80X |
| 3,451,546 | 6/1969 | Murley, Jr. ................. | 209/73 |
| 3,465,878 | 9/1969 | Ochs .......................... | 209/80 |
| 3,469,689 | 9/1969 | O'Neill, Jr. ................. | 209/111.8X |

*Primary Examiner*—Allen N. Knowles
*Attorney*—Campbell, Harris & O'Rourke

ABSTRACT: An electronic closure detection system for sensing presence or absence of closures and, in particular, closures normally hidden from view. The apparatus includes one or more inductive sensors which form part of the frequency-determining network of an oscillator, the frequency of the oscillator being changed by the sensed presence of a closure. Determining circuitry responsive to the output of the oscillator controls energization of means for indicating presence or absence of the closures, and provides a signal for proper gate operation where applicable.

Patented March 30, 1971

INVENTOR.
RICHARD M. QUINN
BY DONNY W. CANDIOTO

Campbell, Harris & O'Rourke
ATTORNEYS

INVENTOR.
RICHARD M. QUINN
DONNY W. CANDIOTO
BY
Campbell, Harris & O'Rourke
ATTORNEYS INVENTOR.
RICHARD M. QUINN
BY DONNY W. CANDIOTO
Campbell, Harris & O'Rourke
ATTORNEYS

INVENTOR.
RICHARD M. QUINN
BY DONNY W. CANDIOTO

Campbell, Harris & O'Rourke
ATTORNEYS

ELECTRONIC CLOSURE DETECTION SYSTEM

BACKGROUND OF THE INVENTION

1. Field of the Invention

This invention relates to a closure detection system and, more particularly, relates to an electronic system for automatically detecting and determining closure presence or absence.

2. Description of the Prior Art

It is oftentimes desirable, and in many cases mandatory, that apparatus be provided to detect the presence or absence of metallic closures, and this is particularly true during processing and/or packaging operations. For example, where glass containers are to be packaged in cartons with closures thereon, it is often impossible to continuously visually monitor the contents of each carton to determine whether the closures are present and in proper position on the containers, particularly where the containers are packed upside down with the closures at the bottom of the carton. In addition, closures are often temporarily collected in boxes or trays during forming operations and it is necessary to assure that all closures have been removed from the boxes or trays prior to reuse, particularly where reuse can involve collecting closures at a different state of formation or for a different customer or product —where mixing of closures cannot be tolerated.

While many devices have been conceived and/or utilized heretofore in attempting to detect closures, none of these devices have been completely successful in accomplishing the desired end. Some of these prior art devices, for example, depend upon mechanical elements and/or magnetic-type sensors in order to detect the presence of metallic closures, and have not proved to have the necessary sensitivity or dependability necessary for at least some contemplated uses, particularly when the closures are within relatively thick containers such as insulated cartons. In addition, some prior detectors, while utilizing a sensor that depended upon oscillator frequency change, did not utilize a system suitable for detecting closure presence.

SUMMARY OF THE INVENTION

This invention provides an improved closure detector for sensing the presence or absence of closures and providing an indication thereof, and is particularly well suited for sensing presence and/or positioning of closures within a packing case or the like. The apparatus includes an inductive sensor which forms a part of a frequency-determining network of an oscillator, the output of which is received by determining circuitry which controls means for indicating closure presence or absence and provides a signal for proper gate operation where applicable.

It is therefore an object of this invention to provide an improved closure detection system, capable of automatic and dependable operation.

It is another object of this invention to provide an improved closure detection system capable of continuously inspecting packages to determine the presence or absence of closures and providing an indication thereof.

It is yet another object of this invention to provide an improved closure detection system having a sensor that is sensitive enough to detect presence and/or positioning of closures within relatively thick packaging.

It is yet another object of this invention to provide an improved electronic closure detection system having an inductive sensor that is a part of a frequency-determining network of an oscillator, the output of which is coupled to determining circuitry which controls indicator means and provides a signal for proper gate operation where needed or desired.

With these and other objects in view, which will become apparent to one skilled in the art as the description proceeds, this invention resides in the novel construction, combination, and arrangement of parts substantially as hereinafter described, and more particularly defined by the appended claims it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE PREFERRED EMBODIMENT

Figure 1:
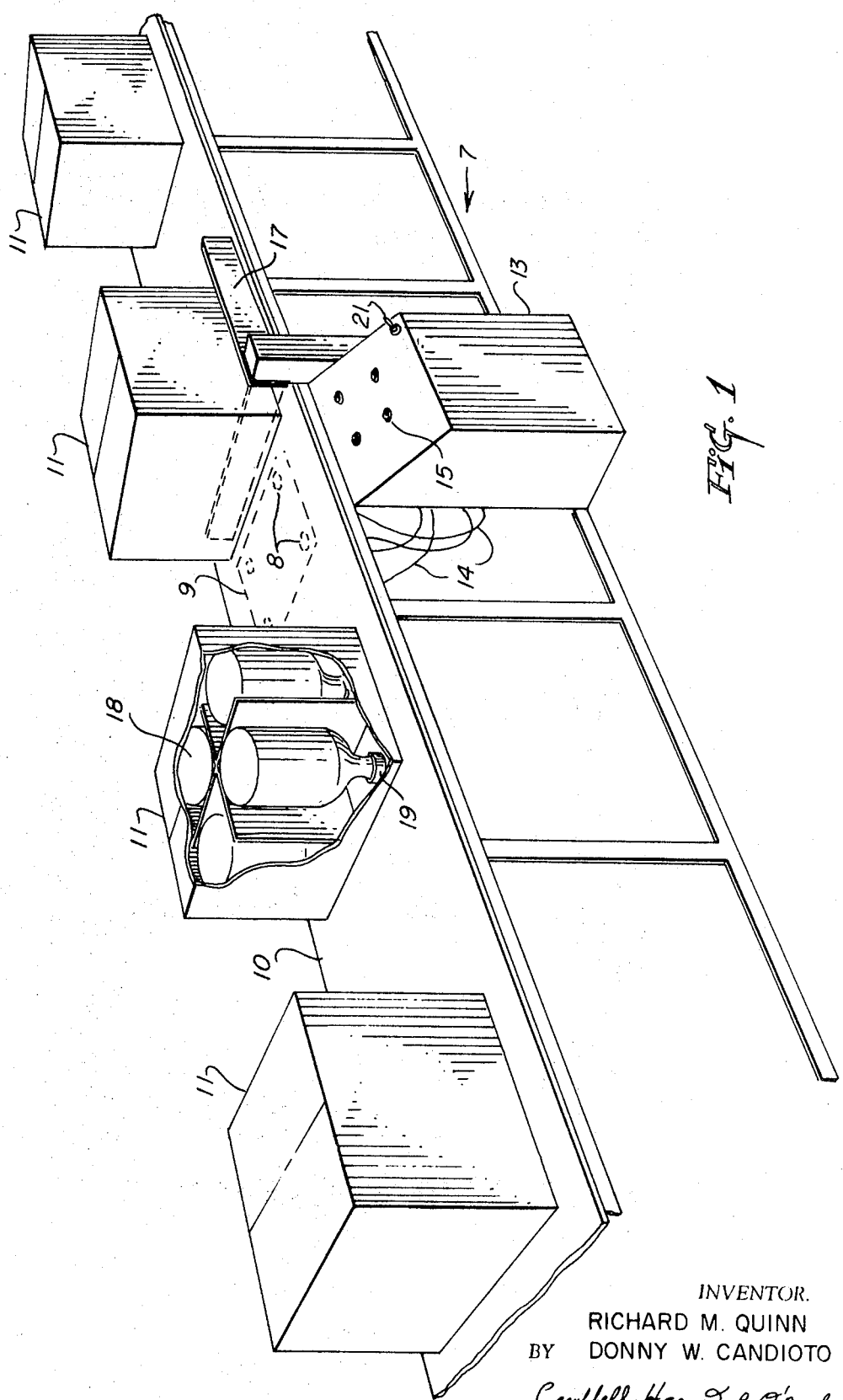
FIG. 1 is a perspective illustrative view of the electronic sensing device of this invention shown adjacent to a conveyor line (only partially shown) for automatically inspecting packing cartons having closures therein as they are transported along said conveyor line.

Referring now to the drawings, the numeral 7 refers generally to the electronic detector system of this invention. Electronic detector system 7 includes inductive sensors 8, which, as shown in FIG. 1, are mounted on a board 9, preferably an epoxy board, adjacent to and just below a conventional conveyor 10. Conveyor 10 is shown in FIG. 1 for illustrative purposes as a nonmetallic belt. It is to be realized, however, that other conveyors could be utilized as, for example, spaced rollers and the like.

As also shown in FIG. 1, conveyor 10 is utilized to transport packages such as paperboard cartons 11 along the conveyor, with closures within each carton being automatically inspected or monitored by electronic detector system 7 as the cartons are over the section of the conveyor adjacent to board 9.

If carton 11 includes four inverted 1-gallon jugs 18, for example, having closures 19 thereon, four sensors are preferably used, as shown in FIG. 1, so that the system can simultaneously determine the presence or absence and proper positioning of each of the four closures. It is to be realized, of course, that use of four sensors as shown in FIG. 1, is merely illustrative of one particular application of the system of this invention, and that the number of sensors can be varied as needed depending upon the particular requirements for package inspection. For example, if a box or tray is to be checked to assure that no closures have been left therein, as could be desirable during the closure-forming process as brought out hereinabove, a single sensor could be utilized to scan the entire bottom of the package or tray.

Figure 2:
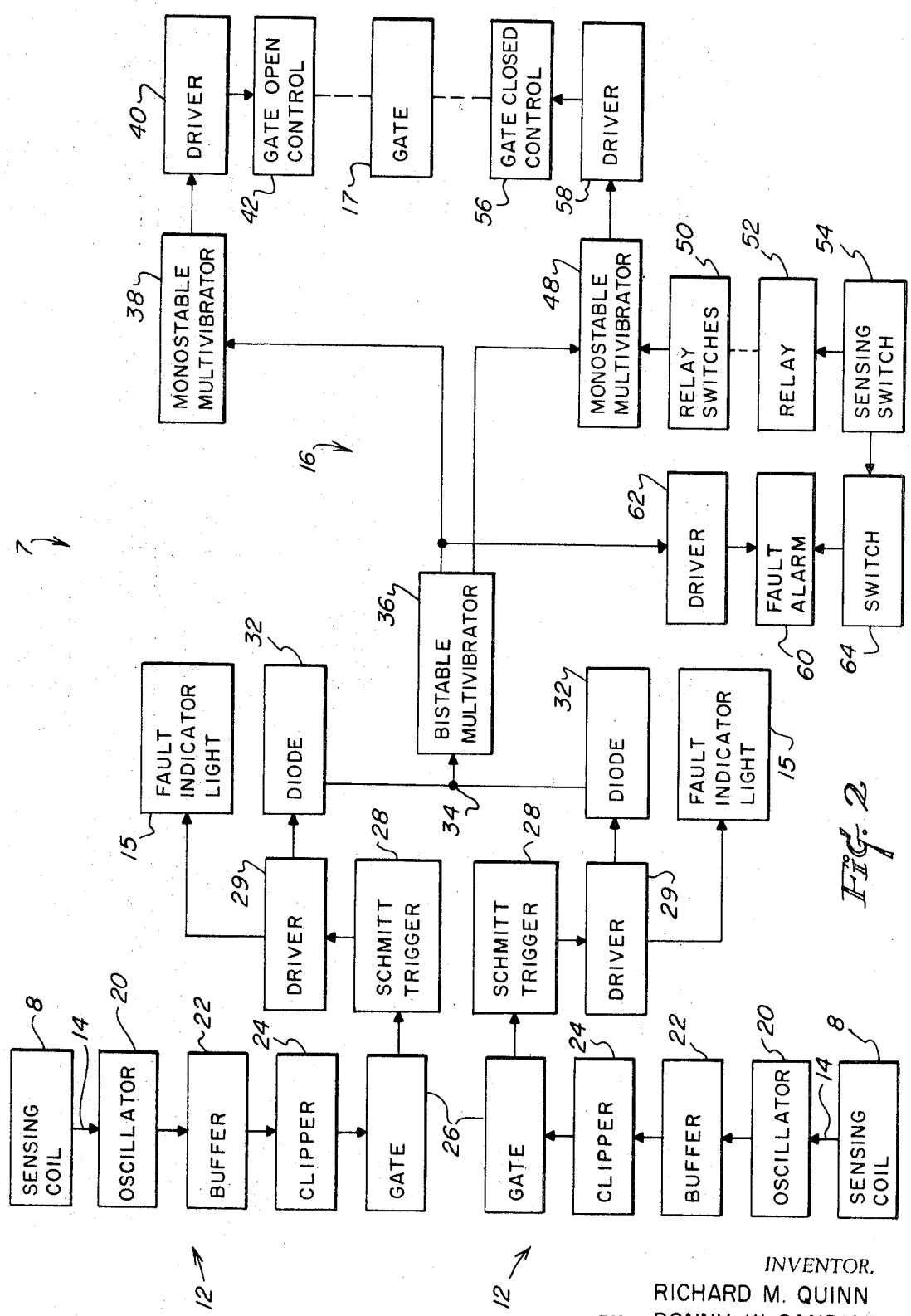
FIG. 2 is a block diagram of the electronic detector system of this invention.

Each sensor utilized has separate determining circuitry 12 (shown in detail in FIGS. 2 and 3) associated therewith for separately determining closure presence or absence and providing an indication of the same. As shown in FIG. 1, all of this circuitry, except for the sensors 8 which are mounted on board 9, can be housed in electronics box 13 preferably close by the sensors with the sensors being connected to the determining circuitry by means of cables 14. Each sensor and associated determining circuitry provides a separate indication of closure presence or absence and this is displayed at the exterior of the electronic box 13 by means of indicating lights 15, as shown in FIG. 1.

Where it is desired that cartons found to have missing or improperly positioned closures be held or segregated from the remainder of the cartons, gate control circuitry 16 (see FIGS. 2 and 4) is provided in electronics box 13 to control operation of gate 17 at conveyor 10, which gate is positioned at or near the point that the cartons are inspected for closure presence. As shown in FIG. 2, gate control circuitry 16 receives signals from all determining circuitry 12 and hence only one control unit is needed, even though a plurality of sensors are utilized. Gate 17 is normally closed, as shown in dotted lines in FIG. 1, and is opened, as shown in solid in FIG. 1, only to allow a carton to pass when all sensors indicate closure presence.

As shown in FIG. 1, an OFF–ON switch 21 can be provided to control power to the unit. It is to be realized, of course, that a plurality of switches could be provided, if desired, to control each sensing circuit.

Referring now to FIG. 2, a block diagram of the detecting apparatus 7 of this invention is shown. The determining circuitry 12 associated with each sensing coil 8 is identical, and only two have been shown in FIG. 2, although it is to be realized that any number can be utilized as desired. For example, four would be utilized if four sensors are utilized as indicated in FIG. 1.

Figure 3:
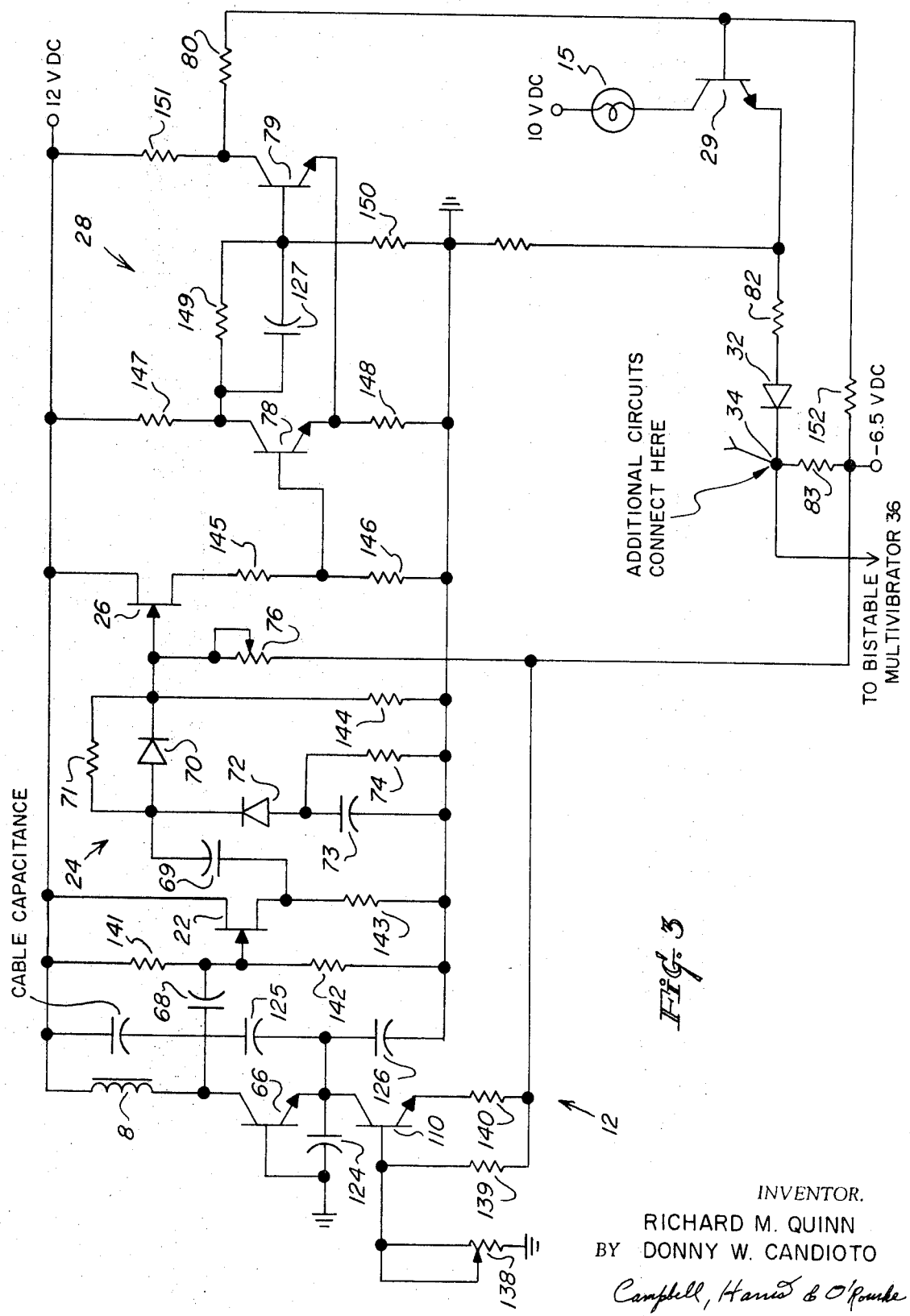
FIG. 3 is a schematic circuit diagram of the sensing and determining circuitry portion of the electronic control system shown in block form in FIG. 2.

As shown in FIG. 2, sensing coil 8 is coupled to oscillator 20 through cables 14, the sensing coil forming a part of the frequency-determining network of the oscillator as shown in FIG. 3. The output from the oscillator is then coupled through buffer 22, which buffer prevents loading of the oscillator circuit. The output from buffer 22 is coupled to clipper 24 where the negative portion of the signal is clipped, with the positive portion then being coupled through gate 26 to Schmitt trigger 28.

The output from Schmitt trigger 28 is then coupled through driver 29 to fault indicator 15, which indicates either the presence or absence of the closure, as desired, depending upon, of course, where the output signal from the trigger is taken. Where the absence of a closure is to be detected, then the fault indicator light would normally be ON, except when a closure enters into the field of the sensor, during which time the light would be OFF to indicate the presence of the cap.

When used in conjunction with a gate for separating or holding the position of a carton, or the like, having an improperly positioned or missing closure, the output from Schmitt trigger 28 is also coupled through diode 32, which diode serves to prevent interaction between circuits when more than one sensing and associated circuitry is utilized, as shown in FIG. 2, for example. The output through diode 32 is coupled through junction 34 to bistable multivibrator 36, this multivibrator receiving the outputs from all of the determining circuits through associated diodes.

When a signal is received indicating the presence of a closure (as sensed by one of the sensing coils 8), multivibrator 36 is caused to change states which causes a change of state of monostable multivibrator 38, the output from which is coupled through driver 40 to energize gate open control 42. Energization of gate open control 42 causes gate 17 to be moved from a closed position to an open position to allow the carton to pass (or pass to an "acceptable" channel).

If sensing coils 8 fail to sense the presence of a closure, or cap, bistable multivibrator 36 is not caused to change states and this results, of course, in no energization of gate open control 42 so that the gate is maintained in closed position. When bistable multivibrator 36 is not caused to change position, the output coupled to monostable multivibrator 48 will be indicative of this state. Monostable multivibrator 48 is controlled, however, by relay switches 50 which are controlled by relay 52, the energization of which is controlled by carton sensing switch 54 (which may be mechanical or could be, for example, a photocell). Monostable multivibrator 48 is actuated when a carton leaves the inspection position adjacent to the sensors to energize gate close control 56 through driver 58 to return gate 17 to the closed position where it will remain until next opened by a signal to again change the state of bistable multivibrator 36.

As also indicated in FIG. 2, an audible alarm 60 is also triggered from the output of bistable multivibrator 36 through driver 62. To assure that alarm 60 will not be energized when a carton is not in the inspecting position, the alarm circuit is opened by sensing switch 54 except during the period when a carton is in the inspecting position. In addition, manual switch 64 can be opened to deenergize the alarm, as desired.

Referring now to FIG. 3, which is a schematic of one sensing coil 8 and associated determining circuitry 12, inductive sensing coil 8 is shown connected to oscillator 20, and more particularly to the collector of transistor 66. It has been found that for the working embodiment shown in schematic form in FIGS. 3 and 4, the desired end can be accomplished utilizing an RF oscillator coil having 18 turns wound on type E core material, with the oscillator having an operating frequency of 2 megahertz. With such an inductive sensor it has been found that an aluminum closure can be detected at a distance of 1 inch and with a 2-inch diameter circle.

The output from oscillator 20 is coupled through a capacitor 68 to field effect transistor 22 (which serves as a buffer to prevent loading of the oscillator circuit). The output from field effect transistor 22 is then coupled through capacitor 69 to clipper 24, which clipper includes a diode network having diode 70 with resistor 71 in parallel therewith and diode 72 with parallel connected capacitor 73 and resistor 74 connected in series therewith.

The output from the diode network (which is the positive portion of the signal only since clipper 24 clipped the negative portion of the signal) is then coupled to field effect transistor 26 which serves as a gate to Schmitt trigger 28. A potentiometer 76 is connected to field effect transistor 26 to compensate for differences in the particular field effect transistor utilized, this potentiometer being adjusted to that Schmitt trigger 28 is caused to assume an ON state between closure-sensing periods.

A closure in the sensor field will cause reduced voltage to be coupled from oscillator 20 and a resultant reduced voltage on the gate of field effect transistor 26, thus reducing the output voltage from the gate to a level that Schmitt trigger 28 is caused to revert to its normal OFF state.

As shown in FIG. 3, the output from field effect transistor 26 is coupled to the base of transistor 78 of Schmitt circuit 28. The output from the Schmitt trigger circuit is taken from the collector of transistor 79 and coupled to the base of driver 29 through resistor 80.

Driver 29 is biased so that it is in a conducting state when transistor 79 of Schmitt trigger 28 is nonconductive, or OFF. This is the case when Schmitt circuit 28 is ON to indicate that there is no closure in the sensor field. While driver 29 is conducting, current flows through the indicator lamp 15 so that the lamp is ON. When a closure enters the field of sensor 8, transistor 79 of Schmitt trigger 28 is turned ON, thus switching driver 29 OFF to thus turn OFF indicator lamp 15. Each of the sensors operates, of course, in this manner and hence only one has been described in detail herein.

Where gate circuitry is to be utilized, an output is taken from the emitter of driver 29 and coupled through resistor 82 and diode 32 to the common junction 34 of all of the determining circuits being utilized, with junction 34 being connected to a negative power supply through resistor 83 for purposes as brought out more fully hereinafter.

Figure 4:
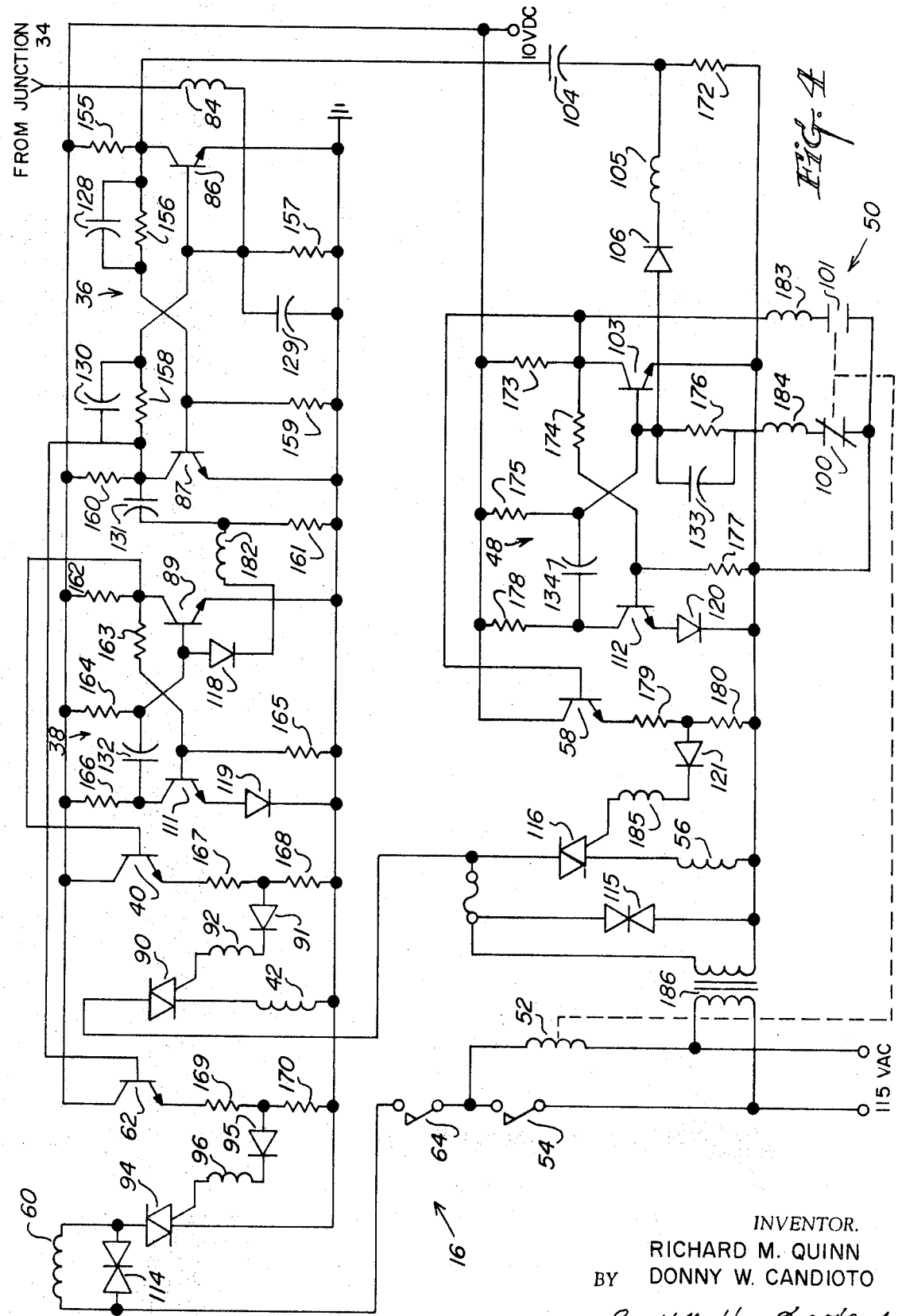
FIG. 4 is a schematic circuit diagram of the gate control circuitry portion of the electronic control system shown in block form in FIG. 2.

As shown in FIG. 4, the combined signal input from junction 34 is coupled through inductor 84 to the base of transistor 86. Since the incoming signal is DC coupled, transistor 86 is normally in a conductive state when no closure is present. When a closure enters the sensor field and is sensed by sensor 8, the resulting signal coupled from Schmitt trigger 28 (assuming no fault signal from another sensor) causes transistor 86 to be switched to an OFF, or nonconductive state, due to the negative potential applied through resistor 83 and inductor 84. When transistor 86 changes states, transistor 87 becomes conductive to trigger open gate monostable multivibrator 38, and more particularly to change the state of transistor 89 therein from a conductive to a nonconductive, or OFF, state. When the state of transistor 89 is changed, the output from the collector coupled to the base of driver 40 causes this transistor to generate a positive going pulse which is coupled to the gate of triac 90 through diode 91 and inductor 92 (as is known in the art, a triac functions in essentially the same manner as would parallel connected, reversed silicon controlled rectifiers). Triac 90 applies voltage to bellows valve solenoid 42 which causes gate 17 to be opened. Monostable multivibrator 38 is maintained in the state with transistor 89 nonconducting for a predetermined period of time sufficient to permit actuation of valve solenoid 42. At the end of this time, monostable multivibrator 38 reverts to its normal condition, which removes power from the solenoid. Gate 17, however, will remain open until closed by actuation of gate close solenoid 56.

An additional output from the collector of transistor 87 of bistable multivibrator 36 is used to actuate audible alarm 60. This signal is DC coupled to the base of driver 62, the output of which is connected to trigger triac 94 through diode 95 and inductor 96. When the absence of a closure is sensed by sensor 8, transistor 87 is in the OFF, or nonconducting, state which applies a positive signal to the base of driver 62, and this, in turn, applies a positive pulse to the gate of triac 94. A positive signal on the triac gate switches ON audible alarm 60.

In order for alarm 60 to be actuated, however, carton-sensing switch 54 and switch 64 must both be closed. Switch 64 is closed wherever the alarm is to be in operation, while carton-sensing switch 54 is closed only when a carton is in the inspect position, so that the alarm is not actuated when there is no carton present at the sensing, or inspect, station. Alarm 60, when actuated, will remain ON until the closure presence is sensed by the sensing coil 8 to change the state of the control bistable 36, or the carton is removed from the inspect station to open switch 54.

Monostable multivibrator 48 and associated circuitry are identical to that used in the gate-opening circuitry which includes monostable multivibrator 38. Gate-closed solenoid 56 of the bellows valve, actuates the piston to move gate 17 to the closed position. Relay 52 is used to control monostable multivibrator 48, however. As brought out hereinbefore, relay 52 is energized through carton-sensing switch 54, as shown in FIG. 4, so that relay 52 is therefore energized only when a carton is present at the inspect station.

As also shown in FIG. 4, relay 52 contacts relay switches 50 (shown in FIG. 4 as switches 100 and 101 with switch 100 being normally closed and switch 101 being normally open) so that when energized, switch 101 is closed and switch 100 opened. Closing of switch 101 clamps the collector of transistor 103 of monostable multivibrator 48 to ground. If a gate close signal is received by transistor 103 from the determining circuits through capacitor 104, inductor 105 and diode 106, the circuit is prevented from switching. After the carton clears carton-sensing switch 54, however, relay 52 is deenergized which opens switch 101. This unclamps transistor 103 of gate close monostable multivibrator 48 and causes gate close monostable multivibrator 48 to change states. This results in close solenoid 56 being energized to close gate 17.

In operation, if a plurality of sensors are utilized as indicated in FIG. 1, a carton conveyed to the inspecting station will cause the indicator light state to change to indicate closure presence and proper positioning (the light will turn off, for example). If all lights change states to indicate closure presence as sensed by all sensors, then the gate will be opened to allow the carton to pass.

Since all of the sensors are united at junction 34, however, any one sensor sensing an absence of a closure will maintain the input to the gate circuitry positive. Thus, control bistable multivibrator 36 will be kept from switching when any sensor senses closure absence so that the gate open monostable 38 cannot be switched to open gate 17 to allow a carton to pass so long as any absence of a closure is detected. In addition, a positive potential is applied to audible alarm 60 to actuate this alarm (and at least one indicator light will be in a state to indicate which sensor has sensed closure absence). When corrected so that all sensors sense closure presence, bistable multivibrator 36 will switch to open the gate and deenergize the alarm.

Particular values for the components shown in the circuit diagrams of FIGS. 3 and 4 are as follows:

Transistors and Diodes: 22 and 26—MPF 102; 90, 94 and 116—40429; 114—6RS20P4B4; 115—6RS20P1B1; 29, 40, 58, 62, 66, 78, 79 and 110—2N697; 86, 87, 89, 103, 111 and 112—2N388; 32, 106, 118, 119 and 120—1N458; 70 and 72—1N4009; 91, 95, and 121—1N2070. Inductors: 84, 92, 96, 105, 182, 184, and 185—68UH. Transformer 186—F16X. Capacitors: 68, 128 and 130—220 pf.; 69—1mfd.; 73, 104, 129 and 131—0.01mfd.; 124—0.004 mfd.; 125—75 pf.; 126—0.005 mfd.; 127—100 pf.; 132 and 134—20 mfd.; 133—0.1 mfd. Resistors: 71—68K; 74 and 141—2.2 M; 76—LM; 80—680; 82 and 148—33; 83—56K; 138—500; 139, 168, 170, and 180—270; 140, 165, 175, 176 and 177—4.7K; 142—1.5 M; 143, 157 and 159—2.7K; 144—680K; 145—1K; 146—22K; 147—15K; 149—10K; 150—8.2K; 151—2.2K; 152—33K; 153—68; 155—160, 162, 166, 173 and 178—1.5K; 156 and 158—5.6K; 161, 163, 164, 172 and 174—6.8K; 167, 169 and 179—150. It is to be realized, however, that these components are meant to be illustrative of one working embodiment of the invention and are not meant to indicate any limitation to the particular values set forth.

From the foregoing it can be seen that this invention provides an improved closure detection system that is capable of quickly and dependably sensing presence or absence of closure and indicating the same, and, in addition, providing novel circuitry for automatically inspecting and controlling movement of packages containing closures.

We claim:

1. A closure detection device, comprising: a frequency-determining unit including sensing means, said unit effecting a different output signal in a first closure condition wherein a closure is within a predetermined distance of said sensing means than in a second closure condition wherein no closure is present within said predetermined distance of said sensing means; circuit means connected with said frequency-determining unit to receive the output signal therefrom, said circuit means including trigger means having an output dependent upon said output signal from said frequency-determining unit and being indicative thereof, said circuit means also having gate means through which said output signal from said frequency-determining unit is coupled to said trigger means; and utilization means connected with circuit means so that operation of said utilization means is controlled by said output from said circuit means.

2. The device of claim 1 wherein said utilization means includes an indicator light that is in one ON–OFF state when a closure is present within said predetermined distance of said sensing means and in the opposite state when a closure is not so present.

3. A closure detection device, comprising: an oscillator having a frequency-determining network which includes a sensing coil, said coil being positioned so that a change in frequency occurs when a metallic closure is within the RF field of said coil; processing means connected with said oscillator and coupling a voltage of predetermined magnitude from said oscillator when no closure is within the RF field of said coil and a voltage of reduced magnitude when a closure is within said RF field; an adjustable level gate circuit; trigger means for receiving said voltage through said gate circuit and responsive thereto assuming a first state to produce one output when said voltage is of predetermined magnitude and assuming a second state to produce a different output when said voltage is of reduced magnitude; and indicating means connected with said trigger means to indicate closure presence when said trigger means is one state and to indicate closure absence when said trigger means is in the other state.

4. The device of claim 3 wherein said processing means also includes clipping means and buffer means connected between said oscillator and said gate circuit.

5. The device of claim 4 wherein said gate circuit and said buffer means each includes a field effect transistor.

6. A closure detection device, comprising: an oscillator having a frequency-determining network which includes a sensing coil, said coil being positioned so that a change in frequency occurs when a metallic closure is within the RF field of said coil; clipping means for clipping one portion of the output signal coupled from said oscillator; an adjustable level gate circuit; a Schmitt trigger circuit connected to receive said clipped signal through said gate circuit; and indicating means connected with said Schmitt trigger circuit whereby said indicating means is caused to indicate closure presence when said Schmitt trigger circuit is in one state and closure absence when said Schmitt trigger circuit is in the second state.

7. The device of claim 6 further characterized by conveying means for conveying metallic closures to and from said RF field of said coil, a gate adjacent to said conveying means, and control means connected with said gate and said Schmitt trigger circuit for controlling movement of closures on said conveying means.

8. A metallic article detection device, comprising: an oscillator having a frequency-determining network which includes a sensing coil, said coil being positioned so that a change in frequency occurs when a metallic article is within the RF field of said coil; processing means connected with said oscillator and coupling a voltage of predetermined magnitude from said oscillator when no article is within the RF field of said coil and a voltage of reduced magnitude when an article is within said RF field; an adjustable level gate circuit; trigger means for receiving said voltage through said gate circuit and responsive thereto assuming a first state to produce one output when said voltage is of predetermined magnitude and assuming a second state to produce a different output when said voltage is of reduced magnitude; and indicating means connected with said trigger means to indicate presence of said metallic article when said trigger means is in one state and to indicate absence of said metallic article when said trigger means is in the other state.

9. A device for detecting a plurality of receptacles conveyed to and from an inspecting station by a conveyor, said device comprising: a plurality of sensing units each of which has a sensing coil at said inspecting station with each said coil being positioned with respect to the other coils in a predetermined manner dependent upon and equivalent to desired positioning of metallic closures within said receptacle, each of said sensing units producing a reduced voltage output when a closure is within the RF field of the coil of that sensing unit; a plurality of trigger units each of which is connected with a different one of said sensing units, each said trigger circuit producing one output when closure presence is indicated by a reduced voltage output received from said sensing unit and a different output when the voltage output received from said sensing unit is not reduced; and a plurality of indicating means each of which is connected to a different one of said trigger circuits for producing different indications depending upon the output received from said trigger circuit.

10. A device for detecting a plurality of closures in a receptacle and automatically controlling receptacle movement away from an inspecting station by conveying means, said device comprising: a plurality of closure sensing units at an inspecting station for detecting closures and producing indications thereof; circuit means including a bistable multivibrator for receiving said indications from said sensing units and changing from a first state to a second state only when indications of closure presence are received from all of said units; and control means connected with said circuit means for permitting said conveying means to convey said receptacle from said inspecting station only after said bistable multivibrator has changed to said second state.

11. A device for simultaneously detecting a plurality of closures within a receptacle conveyed by conveyor means to and from an inspecting station and automatically passing said receptacle only if all of said closures are indicated to be present, said device comprising: a plurality of sensing units each of which has a sensing coil at said inspecting station, each of said units producing an indication of closure presence; a plurality of trigger circuits each of which is connected with a different sensing unit, with each said trigger circuit producing a first output to indicate closure presence and a second output closure absence; bistable multivibrator means connected to receive an output from each of said trigger circuits, said bistable multivibrator means assuming a first condition except when caused to change to a second condition by receipt of indications of closure presence from all of said trigger circuits; and gate means connected with said bistable multivibrator means to pass said receptacle only when said bistable multivibrator means is in said second condition.

12. The device of claim 11 further characterized by a plurality of indicating means each of which is connected with a different one of said trigger circuits whereby closure presence indications can be individually monitored.

13. The device of claim 11 characterized by means to assure closing of said gate means after a receptacle has been passed, said means including a receptacle presence sensing switch.

14. A device for simultaneously detecting a plurality of closures within a receptacle and automatically passing said receptacle only if all of said closures are indicated to be present, the receptacles being conveyed to and from an inspecting station by a conveyor, said device comprising: a plurality of sensing units, each of which includes an oscillator the frequency-determining circuit of which includes a sensing coil that is positioned at said inspecting station with each said coil being positioned with respect to the other coils in a predetermined manner dependent upon desired positioning of metallic closures within said receptacle, each of said sensing units producing a reduced voltage output when a closure is within the RF field of the coil of that sensing unit; a plurality of clipping circuits each of which is connected to a different one of said sensing units for clipping a like portion of the signal from each said unit; a plurality of adjustable level gate circuits each of which is connected to a different one of said clipping units to receive the clipped output therefrom; a plurality of Schmitt trigger circuits each of which is connected to a different one of said gate circuits, each said Schmitt trigger circuits being normally in one state and changed to the second state when reduced voltage is received indicating closure presence; a plurality of indicating lights each connected to a different one of said Schmitt trigger circuits to indicate closure presence when said Schmitt trigger is in said second state; a bistable multivibrator connected to receive an output from all of said Schmitt triggers, said bistable multivibrator being caused to change from a first state to a second state only when the received outputs from all of said Schmitt triggers indicate closure presence; a monostable multivibrator connected to said bistable multivibrator and caused to change states when said bistable multivibrator changes to said second state; a gate positioned to stop receptacles on said conveyor when in closed position and pass receptacles when in open position; control means actuated by a change of state of said monostable multivibrator to cause said gate to be moved to the open position; and means including a receptacle position sensing switch, a relay and a second monostable multivibrator to assure gate closing after said gate has been opened to allow a receptacle to pass.

15. The device of claim 14 further characterized by a fault alarm circuit connected through said receptacle position sensing switch and to said bistable multivibrator for indicating sensed closure absence within a receptacle at the inspecting station.